Nov. 13, 1923.  1,473,633
J. E. LEA
APPARATUS FOR MEASURING GRANULAR OR POWDERED MATERIAL
Filed Feb. 18, 1920  2 Sheets-Sheet 1

Inventor:-
James Edward Lea.
By his Attorney: Walter Gunn

Nov. 13, 1923.

J. E. LEA 1,473,633

APPARATUS FOR MEASURING GRANULAR OR POWDERED MATERIAL

Filed Feb. 18, 1920    2 Sheets-Sheet 2

Inventor:
James Edward Lea.
By his Attorney: Walker Gunn

Patented Nov. 13, 1923.

1,473,633

UNITED STATES PATENT OFFICE.

JAMES EDWARD LEA, OF MANCHESTER, ENGLAND.

APPARATUS FOR MEASURING GRANULAR OR POWDERED MATERIAL.

Application filed February 18, 1920. Serial No. 359,661.

(GRANTED UNDER THE PROVISIONS OF THE ACT OF MARCH 3, 1921, 41 STAT. L., 1313.)

*To all whom it may concern:*

Be it known that I, JAMES EDWARD LEA, a subject of the King of Great Britain and Ireland, and resident of Manchester, England, have invented certain new and useful Improvements in and Relating to Apparatus for Measuring Granular or Powdered Material (for which I have been granted a patent in Great Britain, 137,643, Jan. 22, 1920), of which the following is a specification.

This invention refers to and consists of improvements in apparatus of the kind forming the subject of Letters Patent No. 1,293,130 and it relates in particular to such apparatus when applied to the registering and recording of the amount of fuel fed into a boiler furnace by a travelling grate.

In a chain grate stoker the cross-sectional area of the layer of fuel carried into the furnace by the grate is regulated by the size of an orifice or opening arranged between the front part of the fuel hopper and the furnace, the upper "edge" of the opening being produced by the bottom of a fireproof door, the "ends" of the opening being produced by the vertical faces of the fuel hopper end cheeks, and the lower "edge" of the opening being formed by the surface of the grate. To allow of the depth of the opening being varied the door is made vertically adjustable. By multiplying the area of the opening, and the distance travelled by the grate by means of the registering and recording apparatus described in the said prior patent the total amount of feed is registered and recorded.

In order to obtain an accurate measurement of the fuel it is important that the contour of said orifice or opening, especially after plotting the curve of the integrating drum and adjusting the registering apparatus relatively to the door, shall remain unaltered.

Now in practice it is found that the top "edge" of the said orifice or opening, i. e., the bottom edge of the door, is liable to change its shape (sag or bulge downwards) under the heat of the furnace and thus alter the contour of the orifice and interfere with the accurate measurement of the fuel, this taking place in spite of the fire-brick lining of the door, or through such lining breaking and falling out of position.

According to this invention, the top "edge" of the said orifice, instead of being formed by the bottom edge of the said door, is formed by a strickle appliance which is arranged on the front side of the door (where it is little affected by the heat of the fire) and which extends a short distance below the level of the door, the position and character of the strickle appliance being such as to maintain the original contour of the opening for all positions of the door, as well as to serve to level the fuel as it passes through the opening.

The invention will be further described with the aid of the accompanying drawings, whereon, Fig. 1 is a transverse sectional elevation, and Fig. 2 a front elevation of the front end of a chain grate mechanical stoker, with one example of the invention shown applied thereto.

Figure 1:
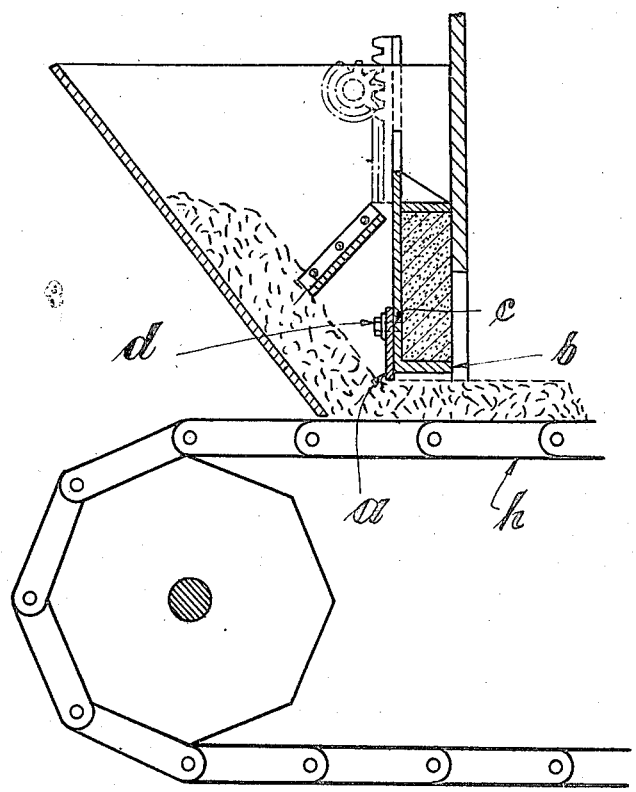
Figure 2:
Figures 5, 6, 7, 8:
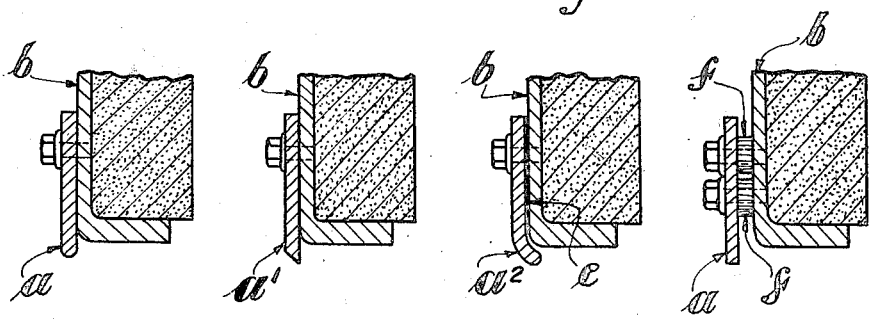
Figs. 5, 6, 7 and 8 illustrate, to a larger scale, cross sections of various modifications hereinafter described.

According to the example shown in Figs. 1, 2 and 5, the invention consists of a thin steel plate $a$ which is a few inches wide and is the same length as the width of the door $b$ of the furnace. Such plate is provided with holes or slots and to the casing of the door $b$ on that side furthest from the fire, screwed set studs $c$ are applied, these studs pass through the holes or slots in the plate $a$ and by which and nuts and washers $d$, the plate may be firmly held to the door, the position of the holes or slots and studs being such that the lower edge of the plate lies a little below the level of the bottom of the door, say three-eights of an inch to half an inch. The said lower edge of the plate corresponds with the longitudinal shape of the lower edge of the door. In some cases the lower edge of the door is straight (horizontal) from end to end, but more usually the middle portion is straight whilst the outer portions inclined, as shown, the object being to make the layer of fuel on the grate thicker at the sides than at the middle of the grate.

In providing and fixing the plate a as described the top edge of the orifice or opening through which the fuel enters the furnace is formed by the lower edge of the plate, and by being fixed to the front face of the door b where it is not adversely affected by the heat of the fire, the plate is not liable to alter the contour of the opening, whilst being of steel and affording a true edge it allows of the accurate measurement of the fuel, notwithstanding any distortion of the bottom edge of the door b.

The lower edge of the plate will preferably be plain as shown in Figs. 5 and 8. A plate $a^1$ having a bevelled edge may be employed, see Fig. 6. Or a plate $a^2$ with its lower edge curved rearwardly may be employed, see Fig. 7.

To protect the plate a from the heat of the fire transmitted through the door b a layer of heat non-conducting material e may be arranged between the plate and door, see Fig. 7. Or the plate may be held clear of the door by washers or collars f, air being free to circulate between the plate and door, see Fig. 8.

As the door b is raised the plate a is also raised and in all positions of the door the lower edge of the plate a forms the top "edge" of the orifice or opening through which the fuel passes and by which the height of the layer of fuel is determined. And by being accurately formed and remaining constant, the plate ensures of accurate measurement at all times.

Figure 3:
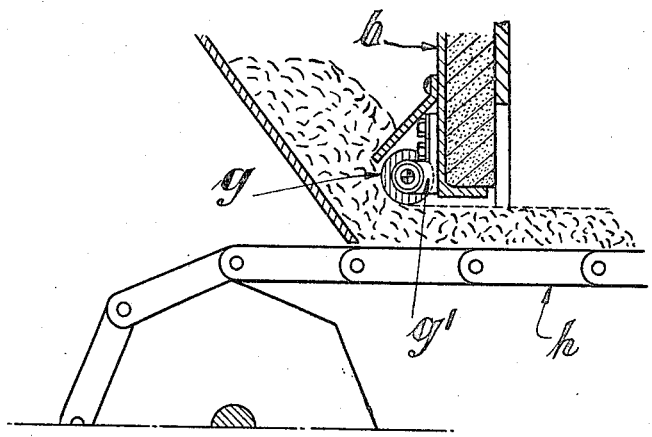
Figs. 3 and 4 are like views showing another example of the invention.
Figure 4:
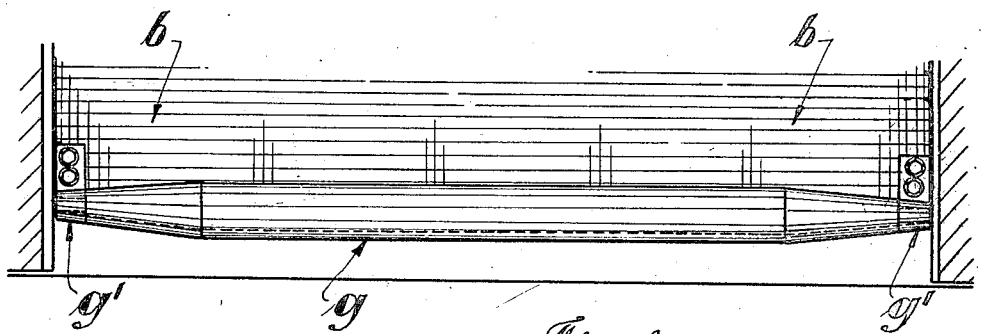

According to the example shown in Figs. 3 and 4, the invention consists of a roller g mounted in bearing brackets $g^1$ secured to the door b, the lower part of the roller lying a slight distance below the level of the bottom edge of the door, and therefore forming the top "edge" of the orifice or opening through which the fuel is carried by the grate h. The roller will preferably be free to rotate but it may be held against rotation. When free to rotate the roller will be rotated by contact with the fuel as the latter passes below it, and therefore, in addition to acting as the top "edge" of the opening, it will serve to prevent the fuel jamming between the roller and the grate, and will also level the fuel as it travels below it. Further with the roller in motion and rotating at the same peripheral speed as the surface of the grate, the fuel will pass or "flow" through the orifice with a minimum of friction, or, in other words, a more or less frictionless orifice is provided.

The roller is of metal and is shaped to correspond with the shape of the bottom edge of the door. In the example shown the edge of the door is bevelled at each end, and therefore the roller is made conical at each end the taper of the roller corresponding to the bevel of the door.

To protect the roller from the heat of the door or furnace, it may be covered with non-conducting material. Although preferring the roller to be smooth, it may be slightly roughened.

To compensate for any wear on the plate a or roller g, the plate or the bearings of the roller are lowered. To relieve the roller of the weight of the fuel in the hopper, a plate (shown in Fig. 3) may be arranged to extend from the door over the roller.

What I claim is:—

1. In a device of the character described comprising a hopper having an opening therein, an endless grate disposed below the hopper and receiving material therefrom, a reciprocating door for regulating the flow of material from the hopper and a strickle appliance rigidly secured to the lower end of the door on the front side and extending below the lower edge of the hopper opening, the said strickle having a flat edge at its center and upwardly tapering edges extending from the flat portion to the sides thereof so that material fed past the strickle will be thickest at the sides of the grate.

2. In a device of the character described comprising a hopper having an opening therein, an endless grate disposed below the hopper and receiving material therefrom, a vertically slidable door within the hopper for regulating the flow of material therefrom, and a strickle appliance comprising a roller and bearings therefor secured to the door on its front side and extending below the lower edge of the hopper opening, the said roller having a cylindrical central portion and tapered end portions whereby the material fed past the same will be thickest at the sides of the grate.

In witness whereof I have hereunto set my hand in the presence of two witnesses.

JAMES EDWARD LEA.

Witnesses:
HY. JUNCA,
J. HARRIS SEBBLE.